US011977403B2

(12) United States Patent
Hegde et al.

(10) Patent No.: US 11,977,403 B2
(45) Date of Patent: May 7, 2024

(54) MULTI-SEGMENT FET GATE ENHANCEMENT DETECTION

(71) Applicant: TEXAS INSTRUMENTS INCORPORATED, Dallas, TX (US)

(72) Inventors: Vinayak Hegde, Bangalore (IN); Rolly Baradiya, New Delhi (IN); Ankur Chauhan, Kharapur (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/090,861

(22) Filed: Dec. 29, 2022

(65) Prior Publication Data

US 2023/0221742 A1 Jul. 13, 2023

(30) Foreign Application Priority Data

Jan. 13, 2022 (IN) ............................. 202241001907

(51) Int. Cl.

*G05F 1/26* (2006.01)
*G05F 1/46* (2006.01)
*G05F 1/56* (2006.01)
*G05F 3/26* (2006.01)

(52) U.S. Cl.

CPC .............. *G05F 1/561* (2013.01); *G05F 1/468* (2013.01); *G05F 3/262* (2013.01)

(58) Field of Classification Search

None

See application file for complete search history.

(56) References Cited

U.S. PATENT DOCUMENTS 5,770,954 A * 6/1998 Tomasini ............. H03K 5/2472 327/63
7,009,403 B2 * 3/2006 Graf ................... G01R 19/0092 327/518
7,027,939 B2 * 4/2006 Fey ......................... B60T 8/885 701/30.6
7,817,393 B2 * 10/2010 Forghani-Zadeh .......................... H03K 17/0822 361/93.7
8,253,383 B2 * 8/2012 Li ........................ G01R 31/396 320/134
8,497,668 B2 * 7/2013 Ha ........................ H03F 1/0211 323/272

(Continued)

*Primary Examiner* — Thomas J. Hiltunen

(74) *Attorney, Agent, or Firm* — Charles F. Koch; Frank D. Cimino

(57) ABSTRACT

In examples, an apparatus includes a FET, first and second voltage-to-current circuits, a current selection circuit, and a comparator. The FET has first and second segments. The first segment has a first gate coupled to the first voltage-to-current circuit, a first source, and a first drain. The second segment has a second gate coupled to the second voltage-to-current circuit, a second source coupled to the first source, and a second drain coupled to the first drain. The current selection circuit has a current selection circuit output and first and second current selection inputs. The first current selection circuit input is coupled to the first voltage-to-current circuit. The second current selection circuit input is coupled to the second voltage-to-current circuit. The comparator has a comparator output and first and second comparator inputs, the first comparator input is coupled to the current selection circuit output.

18 Claims, 4 Drawing Sheets

(56) References Cited

U.S. PATENT DOCUMENTS

| | | | | |
|---|---|---|---|---|
| 9,006,928 | B2 * | 4/2015 | Yoshikuni | H02J 7/35 323/304 |
| 9,134,350 | B2 * | 9/2015 | Kato | G01R 19/00 |
| 9,660,459 | B2 * | 5/2017 | Otsuka | G05F 1/575 |
| 9,973,183 | B2 * | 5/2018 | Zhu | H03K 5/2472 |
| 11,528,025 | B2 * | 12/2022 | Illing | H03K 17/08142 |
| 2004/0155662 | A1 * | 8/2004 | Graf | G01R 19/0092 324/522 |
| 2017/0294772 | A1 * | 10/2017 | Illing | H03M 1/12 |

* cited by examiner

MULTI-SEGMENT FET GATE ENHANCEMENT DETECTION

CROSS-REFERENCE TO RELATED APPLICATIONS

The present application claims priority to India Provisional Patent Application No. 202241001907, which was filed Jan. 13, 2022, is titled "GATE ENHANCEMENT DETECTION SCHEME FOR POWER FET WITH MULTIPLE SEGMENTS AND INDIVIDUAL GATE CONTROLS," and is hereby incorporated herein by reference in its entirety.

BACKGROUND

Some transistors, such as field effect transistors (FETs) are implemented in application environments in which a comparatively large amount of current flows through the FETs. The large current flow causes a corresponding large amount of power dissipation by the FETs. An example of such a FET is a power FET. As power dissipation increases, so too does temperature. As the temperature of a power FET increases, the possibility of potentially catastrophic thermal runaway in the power FET increases.

SUMMARY

In some examples, an apparatus includes a field effect transistor (FET) having first and second segments, in which the first segment has a first gate, a first source and a first drain, the second segment has a second gate, a second source and a second drain, the first and second sources are coupled together, and the first and second drains are coupled together. The apparatus also includes first and second voltage-to-current circuits, the first voltage-to-current circuit coupled to the first gate, and the second voltage-to-current circuit coupled to the second gate. The apparatus also includes a current selection circuit having a current selection circuit output and first and second current selection inputs, the first current selection circuit input coupled to the first voltage-to-current circuit, and the second current selection circuit input coupled to the second voltage-to-current circuit. The apparatus also includes a comparator having a comparator output and first and second comparator inputs, the first comparator input coupled to the current selection circuit output, and the comparator configured to receive a reference signal at the second comparator input.

In some examples, an apparatus includes voltage-to-current circuits coupled to respective gates of a multi-segment FET, the voltage-to-current circuits configured to convert voltages from the gates of the FET into respective currents. The apparatus also includes a current selection circuit coupled to the voltage-to-current circuits, the current selection circuit configured to select a highest value current from among the respective currents. The apparatus also includes a comparator coupled to the current selection circuit, the comparator configured to compare the selected highest current to a reference current.

In some examples, a system includes a multi-segment FET having first and second segments, each of the first and second segments having a respective gate, source, and drain, wherein the source of the first segment and the source of the second segment are coupled together, and the drain of the first segment and the drain of the second segment are coupled together. The system also includes an enhancement detection circuit coupled to the multi-segment FET. The enhancement detection circuit includes first and second voltage-to-current circuits, the first voltage-to-current circuit coupled to the gate of the first segment, and the second voltage-to-current circuit coupled to the gate of the second segment. The enhancement detection circuit also includes a current selection circuit having a current selection circuit output and first and second current selection inputs, the first current selection circuit coupled to the first voltage-to-current circuit and the second current selection circuit input coupled to the second voltage-to-current circuit. The enhancement detection circuit also includes a comparator having a comparator output and first and second comparator inputs, the first comparator input coupled to the current selection circuit, and the second comparator input configured to receive a reference signal. The system also includes a protection circuit coupled to the comparator output and the multi-segment FET, the protection circuit configured to electrically decouple the multi-segment FET from a power source responsive to an asserted value at the comparator output, the asserted value indicating that the multi-segment FET is operating in a linear region of operation.

DETAILED DESCRIPTION

Figure 1:
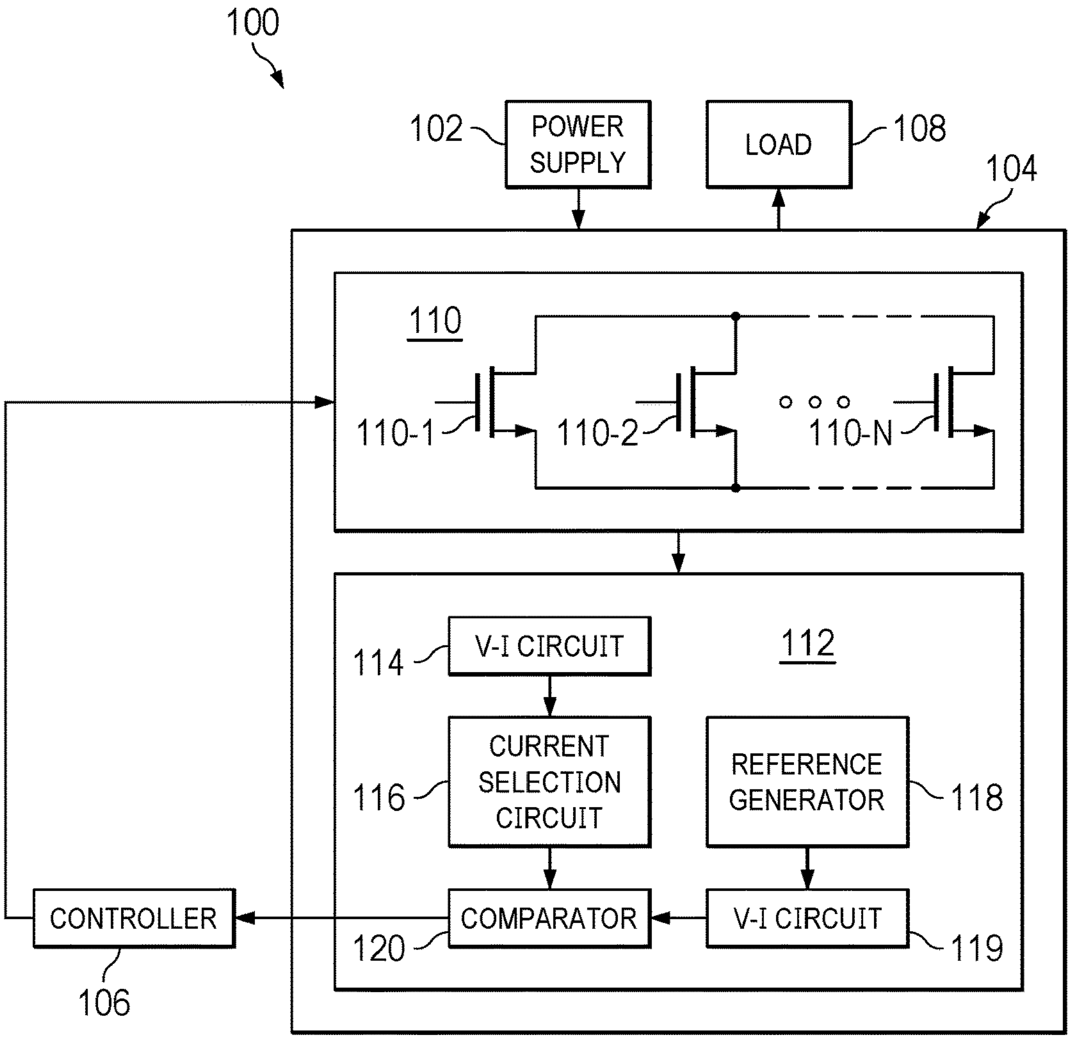
FIG. 1 is a block diagram of a system, in accordance with various examples.

As described above, in some application environments power FETs are subject to conditions that may increase a possibility of thermal runaway. In an example, thermal runaway in a power FET occurs as a result of positive thermal feedback. For example, a rise in temperature of the power FET (such as due to current interacting with the power FET) induces an occurrence of a condition which causes further temperature rise, which further induces the condition, and so on and so forth such that the temperature of the power FET increases uncontrollably. A power FET that experiences thermal runaway may have degraded future performance after the thermal runaway, or may be destroyed or otherwise rendered unsuitable for its intended purpose. To protect against thermal runaway, junction temperature of the power FET, current flowing through the power FET, a region of operation of the power FET, or a combination thereof may be monitored. For power FETs that are large in surface area, such as to facilitate increased current flow, a temperature gradient may occur on the surface such that two points on the surface of power FET which are sufficiently spaced apart may have a considerable temperature difference. In some examples, the spacing may be about 50 micrometers (μm) or more and the temperature difference may be about 3 degrees Celsius or greater. As a result, a single-point temperature measurement may be inaccurate or have limited viability for such a power FET. Similarly, current densities across the power FET surface may vary between two points on the surface of the power FET which are sufficiently spaced apart. As a result, a single-point current measurement may be inaccurate or have limited viability for such a power FET.

To mitigate these challenges, a power FET may be divided into multiple segments. Each segment may have its own corresponding temperature and current monitoring. Each segment may also have its own independent control. For example, based on the monitoring, current through one segment may be modified based on the independent control without modifying current though another of the segments. The independent segment control may create additional challenges, such as synchronization among the segments and detection of a region of operation of each segment of the power FET. For example, at startup of the power FET each of the segments may be in a saturation region of operation and the power FET is deemed to have successfully started-up responsive to all segments of the power FET transitioning to operate in a linear region of operation. To make such a determination, a gate of each segment may be monitored to determine whether the gate is fully enhanced. In non-segmented power FETs, a gate to source voltage (Vgs) of the power FET may be compared to a programmed voltage to determine whether the gate is fully enhanced. Such an implementation includes a fixed reference source and a comparator. Thus, for a segmented power FET having N segments, N fixed reference sources and N comparators may be implemented to perform the detection. However, such an implementation may be size and power consumption prohibitive, making it infeasible for practical application environments.

Examples of this description include a gate enhancement detection circuit for multi-segment FETs. The gate enhancement detection circuit includes a voltage-to-current (V-I) circuit, a current selection circuit, and a comparator. In some examples, the gate enhancement detection circuit includes, or is coupled to, a reference generator circuit. The V-I circuit includes components suitable for detecting a voltage provided at each gate of the segments of the power FET and converting the voltages to currents to provide to the current selection circuit. In an example, the V-I circuit includes multiple separate V-I circuits, where each of the separate V-I circuits corresponds uniquely to the gate of one segment of the multi-segment power FET. The current selection circuit includes components suitable for selecting a current having a highest value from among the respective currents received by the current selection circuit from the V-I circuit. An output of the current selection circuit is provided to a first input of the comparator, where a current representative of a reference voltage (e.g., a programmed voltage) provided by the reference generator circuit is provided to a second input of the comparator. Responsive to the comparator providing a comparison result having an asserted value (e.g., the output of the current selection circuit being greater in value than the current representative of the reference voltage), the multi-segment power FET is determined to be in the linear region of operation. Responsive to the comparator providing the comparison result having a deasserted value (e.g., the output of the current selection circuit not being greater in value than the current representative of the reference voltage), the multi-segment power FET is determined to not be in the linear region of operation. Based on a determination of the power FET operating in the linear region of operation circuit safety or protection features may be activated, such as active current balancing.

FIG. 1 is a block diagram of a system 100, in accordance with various examples. In an example, the system 100 includes a power supply 102, a power protection circuit 104, a controller 106, and a load 108. In an example, the power protection circuit 104 is an electronic fuse circuit. The power protection circuit 104 includes a power FET 110 and a monitoring circuit 112. The power FET 110 may be, for example, a multi-segment power FET, as described herein, having N segments (e.g., 110-1, 110-2, . . . 110-N). In an example, the controller 106 provides gate control signals to the power protection circuit 104 to control operation of the power FET 110. For example, based on an output of the monitoring circuit 112, the controller 106 may control the power FET 110 to be in a non-conductive or less-conductive state, thus electrically decoupling the load 108 from the power supply 102 or reducing a current flow through the power FET 110 or a particular segment of the power FET 110.

In an example, the monitoring circuit 112 monitors the power FET 110 to determine whether each gate of the power FET 110 is in an enhanced state such that the power FET 110 is in a linear region of operation. To perform the monitoring, the monitoring circuit 112 includes a V-I circuit 114, a current selection circuit 116, a reference generator 118, a V-I circuit 119, and a comparator 120. A number of inputs and outputs of the V-I circuit 114 may be equal to a number of segments of the power FET 110. For example, for a power FET 110 having N segments, the V-I circuit 114 may include N inputs and outputs. Each V-I circuit 114 input is coupled to a respective gate of the power FET 110 and each V-I circuit 114 output is coupled to a respective input of the current selection circuit 116. The current selection circuit 116 has an output coupled to a first input of the comparator 120. The reference generator 118 has an output coupled to an input of the V-I circuit 119, which has an output coupled to a second input of the comparator 120. In various examples, the V-I circuit 119 has an architecture similar to the V-I circuit 114. The comparator 120 provides a comparison result at its output that indicates whether each gate of the power FET 110 is in an enhanced state, such that the power FET 110 may be determined to be in a linear region of operation. In an example, the controller 106 makes the determination that the power FET 110 is in the region of operation based on the comparison result having an asserted value (e.g., indicating that an output signal of the current selection circuit 116 is greater in value than an output signal of reference generator 118).

Figure 2:
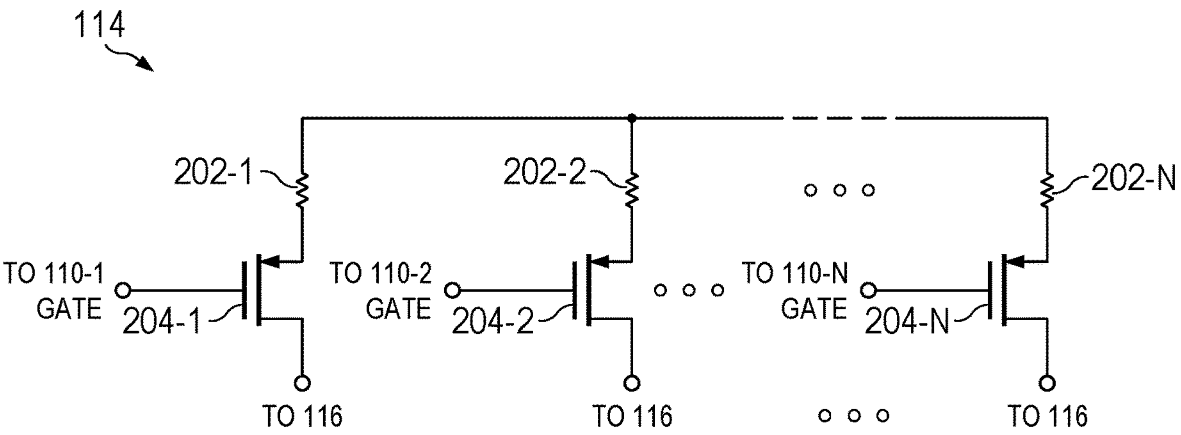
FIG. 2 is a schematic diagram of a V-I circuit, in accordance with various examples.

FIG. 2 is a schematic diagram of the V-I circuit 114, in accordance with various examples. The V-I circuit 114 may be divided into N branches, with each branch including a resistor 202 and a transistor, such as a p-channel metal-oxide semiconductor (PMOS) 204. For example, branch 1 of the V-I circuit 114 includes resistor 202-1 and PMOS 204-1, branch 2 of the V-I circuit 114 includes resistor 202-2 and PMOS 204-2, and branch N of the V-I circuit 114 includes resistor 202-N and PMOS 204-N. Each of the PMOS 204 has a gate coupled to a respective gate of a segment of the power FET 110. For example, a gate of PMOS 204-1 is coupled to a gate of the power FET 110-1, a gate of PMOS 204-2 is coupled to a gate of the power FET 110-2, and a gate of PMOS 204-N is coupled to a gate of the power FET 110-N.

In an example, each resistor 202 is coupled between a power supply (not shown) and a source of a respective PMOS 204. The power supply may be a same power supply as is coupled to the power FET 110. For example, the power supply may be the power supply 102. An output of a respective branch of the V-I circuit 114 is provided at a drain of the PMOS 204 of that respective branch. In an example, the V-I circuit 114 is configured to convert a voltage value to a current representation. For example, for each gate of the power FET 110, the V-I circuit 114 provides a corresponding signal having a current representative of a voltage provided at the gate of the power FET 110. In at least some implementations, as the gate voltage (Vg) of a gate of a segment of the power FET 110 increases, a gate to source voltage (Vgs) of a PMOS 204 coupled to that gate decreases. As Vgs of a PMOS 204 decreases, current flowing through that PMOS 204 correspondingly decreases. Conversely, as Vg of a gate of a segment of the power FET 110 increases, Vgs of a PMOS 204 coupled to that gate increases. As Vgs of a PMOS 204 increases, current flowing through that PMOS 204 correspondingly increases. As an amount of enhancement of a gate of the power FET 110 increases, a current flowing through a branch of the V-I circuit 114 coupled to that respective gate decreases, and vice versa. Thus, a segment of the power FET 110 that is most enhanced from among all segments of the power FET 110 will correspond to a branch of the V-I circuit 114 that provides a signal having a lowest value current from among all output signals of the V-I circuit 114. Conversely, a segment of the power FET 110 that is least enhanced from among all segments of the power FET 110 will correspond to a branch of the V-I circuit 114 that provides a signal having a highest value current from among all output signals of the V-I circuit 114.

In an example, a quiescent current of the V-I circuit 114 is reduced resulting from the PMOS architecture of the V-I circuit 114. For example, as the power FET 110 reaches steady-state (e.g., a voltage provided at a gate of the power FET 110 reaches its largest value in the system 100), the gate and source of the PMOS 204 are at approximately a same potential, thus causing approximately no current to flow through the PMOS 204.

Figure 3:
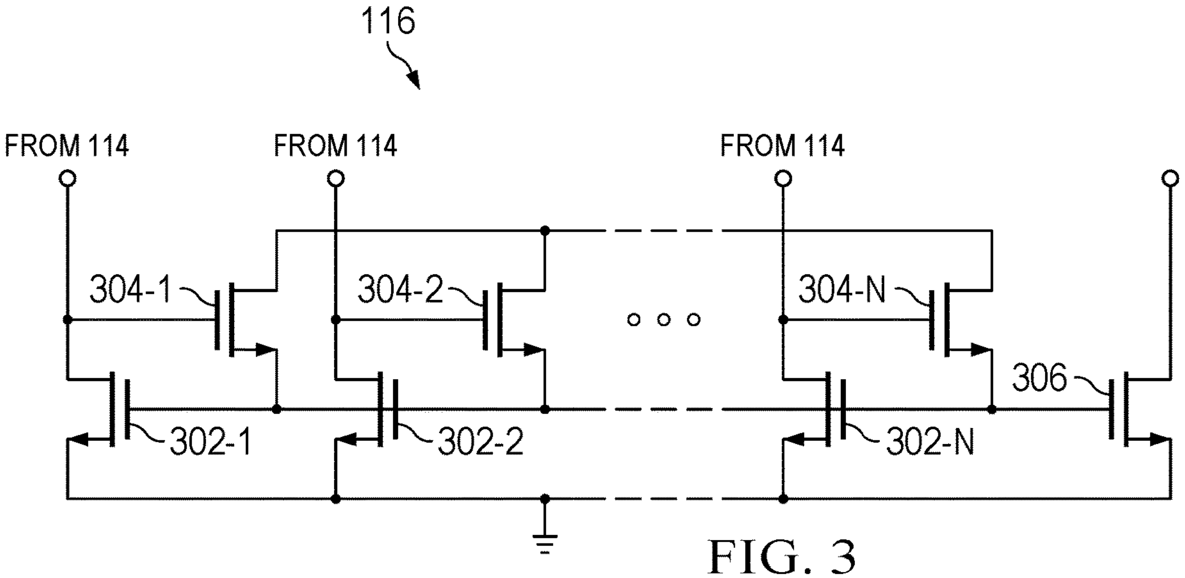
FIG. 3 is a schematic diagram of a current selection circuit, in accordance with various examples.

FIG. 3 is a schematic diagram of the current selection circuit 116, in accordance with various examples. In an example, the current selection circuit 116 includes N branches, with each branch of the current selection circuit 116 uniquely corresponding to a respective branch of the V-I circuit 114 and gate of a segment of the power FET 110. Each branch of the current selection circuit 116 includes a transistor 302 and a transistor 304. For example branch 1 of the current selection circuit 116 includes transistor 302-1 and transistor 304-1, branch 2 of the current selection circuit 116 includes transistor 302-2 and transistor 304-2, and branch N of the current selection circuit 116 includes transistor 302-N and transistor 304-N. In some examples, the transistors 302 and transistors 304 are n-channel metal-oxide semiconductor (NMOS) transistors. Each transistor 302 has a drain coupled to a gate of the transistor 304, a gate coupled to a source of the transistor 304, and a source coupled to a ground terminal. The transistor 304 has a drain coupled to a power supply (not shown). In some examples, the power supply is the power supply 102. In an example, the drain of the transistor 302 (and correspondingly gate of the transistor 304) is an input of a respective branch of the current selection circuit 116 (e.g., as is coupled to an output of the V-I circuit 114, such as the drain of a PMOS 204).

In an example of operation, the each branch of the current selection circuit 116 compares the input currents received from the V-I circuit 114 and selects a current having a highest value from among the received currents. The current having the highest value is mirrored to a transistor 306, which has a gate coupled to the gates of the transistors 302, a source coupled to the ground terminal, and at which an output signal of the current selection circuit 116 is provided. For example, the transistors 302 are arranged in a current mirror arrangement such that the gates of the transistors 302 are coupled together. The current mirror is enabled through transistors 304, which are coupled in a source follower arrangement. Accordingly, a gate voltage of each transistor 302 has an approximately same value and is determined according to a highest value current flowing between the drain and source of a transistor 302 of the current selection circuit 116. Resulting from the source follower arrangement, a value provided at the gates of the transistors 304 is also provided at the source of the transistors 304, and therefore at the gates of the transistors 302. Because the transistor 306 has a gate coupled to the gates of the transistor 302, the highest value current at the gates of the transistors 304 and flowing between the drain and source of a corresponding transistor 304 is mirrored to flow through the transistor 306.

Figure 4:
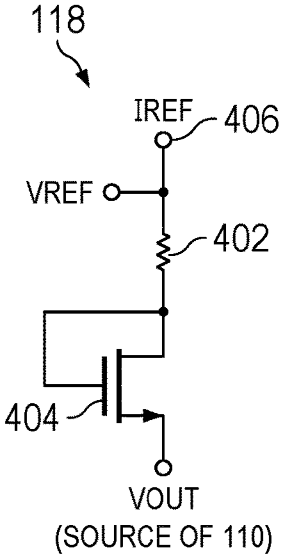
FIG. 4 is a schematic diagram of a reference generator, in accordance with various examples.

FIG. 4 is a schematic diagram of the reference generator 118, in accordance with various examples. As described above, the reference generator 118 provides a reference signal (VREF) having a voltage that is a function of a threshold voltage of the power FET 110 and a voltage provided at an output of the power FET 110, such as its source. In some examples, the reference signal is insensitive to variation in process or temperature of the system 100 and provides a direct correlation to behavior of the power FET 110. In an example, the reference signal has a value corresponding to a voltage higher than a voltage having a smallest value sufficient for causing the power FET 110 to operate in the linear region of operation. The reference signal is provided to the V-I circuit 119 by the reference generator 118 and correspondingly provided by the V-I circuit 119 as a current representation of the reference signal.

In an example, to provide the reference signal, the reference generator 118 includes a resistor 402 and a transistor 404. The resistor 402 is coupled between a drain of the transistor 404 and terminal 406 at which a reference current (IREF) is received. In some examples, the reference current is received from a reference source, such as a bandgap reference circuit (not shown). The transistor 404 has a gate coupled to its drain and a source coupled to the source of the power FET 110. In an example, the reference generator 118 is configured to provide VREF at the terminal 406. In some examples, the transistor 404 is a replica of the power FET 110 such that the power FET 110 and the transistor 404 have an approximately same threshold voltage (Vt). In an example, VREF has a value determined according to Vt and the output voltage of the power FET (VOUT), as described above, such as according to the following equation 1. In an example, the resistor 402 has a resistance value such that a voltage provided at the gate of the transistor 404 is 1.4 volts (V).

$$VREF=VOUT+Vt+1.4 \qquad (1)$$

Figure 5:
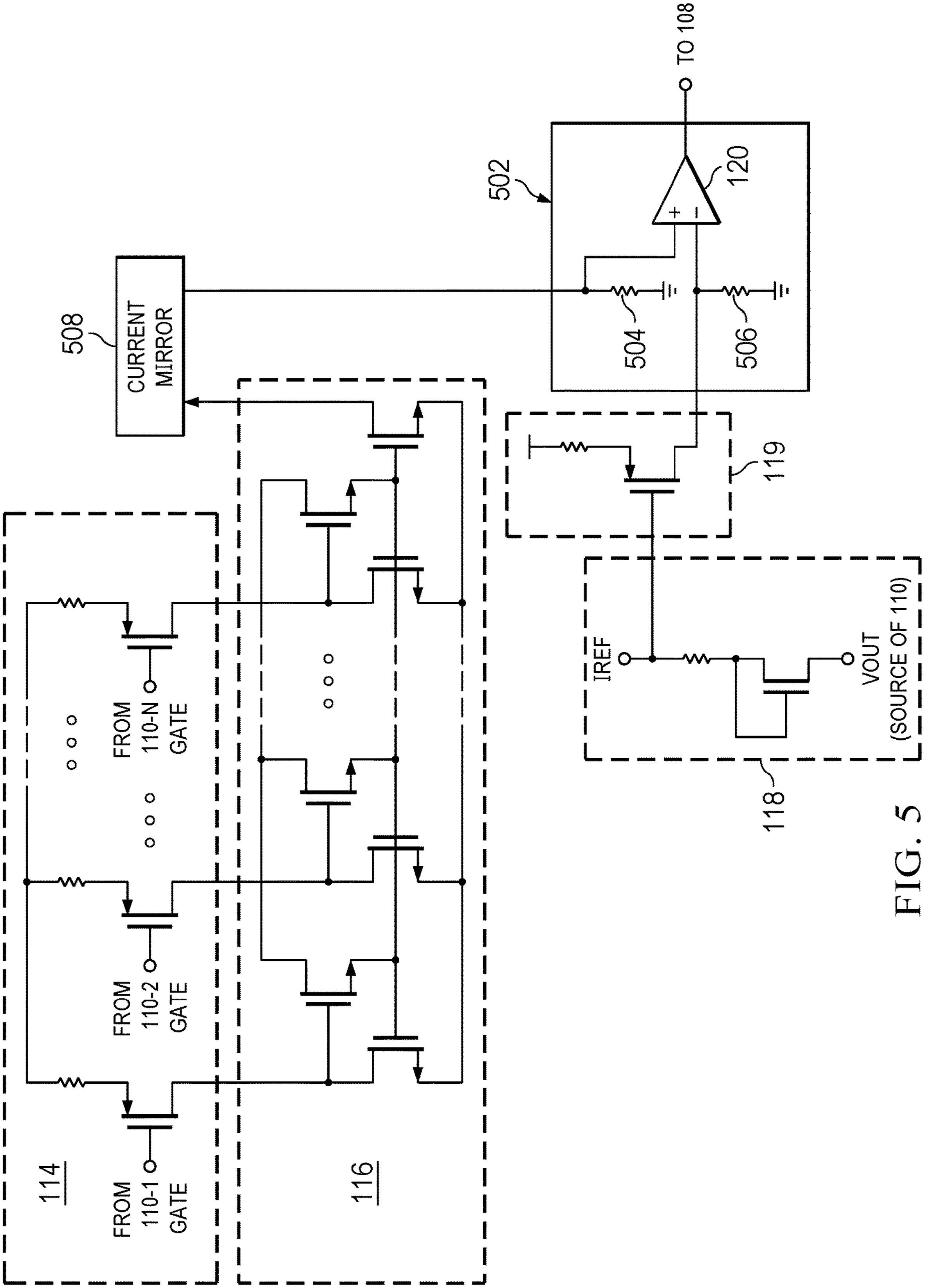
FIG. 5 is a schematic diagram of a monitoring circuit, in accordance with various examples.

FIG. 5 is a schematic diagram of the monitoring circuit 112, in accordance with various examples. In an example, the V-I circuit 114, the current selection circuit 116, the reference generator 118, and the V-I circuit 119 are as described above with respect to FIGS. 1-4, and such description is not repeated with respect to FIG. 5.

In an example, an output stage 502 of the monitoring circuit 112 includes the comparator 120, a resistor 504, and a resistor 506. The resistor 504 is coupled between a first input (e.g., a non-inverting input) of the comparator 120 and the ground terminal. The resistor 506 is coupled between a second input (e.g., an inverting input) of the comparator 120 and the ground terminal. An output signal of the current selection circuit 116 is provided to the first input of the comparator 120. In some examples, a current mirror 508 mirrors the current from the transistor 306 to the first input of the comparator 120. An output signal of the V-I circuit 119 is provided to the second input of the comparator 120. The comparator 120 compares the signals received at its first and second inputs and provides a comparison result having a value determined based on the comparison. For example, responsive to the signal received at the first input of the comparator 120 having a value that exceeds a value of the signal received at the second input of the comparator 120, the comparator 120 provides the comparison result having an asserted value. Responsive to the signal received at the first input of the comparator 120 having a value that does not exceed the value of the signal received at the second input of the comparator 120, the comparator 120 provides the comparison result having a deasserted value. In some examples, the comparison result having the asserted value indicates that the power FET 110 is operating in the linear region of operation (and each gate of the power FET 110 is in an enhanced state). Conversely, the comparison result having the deasserted value indicates that the power FET 110 is not operating in the linear region of operation (and at least one gate of the power FET 110 is not in an enhanced state).

Figure 6:
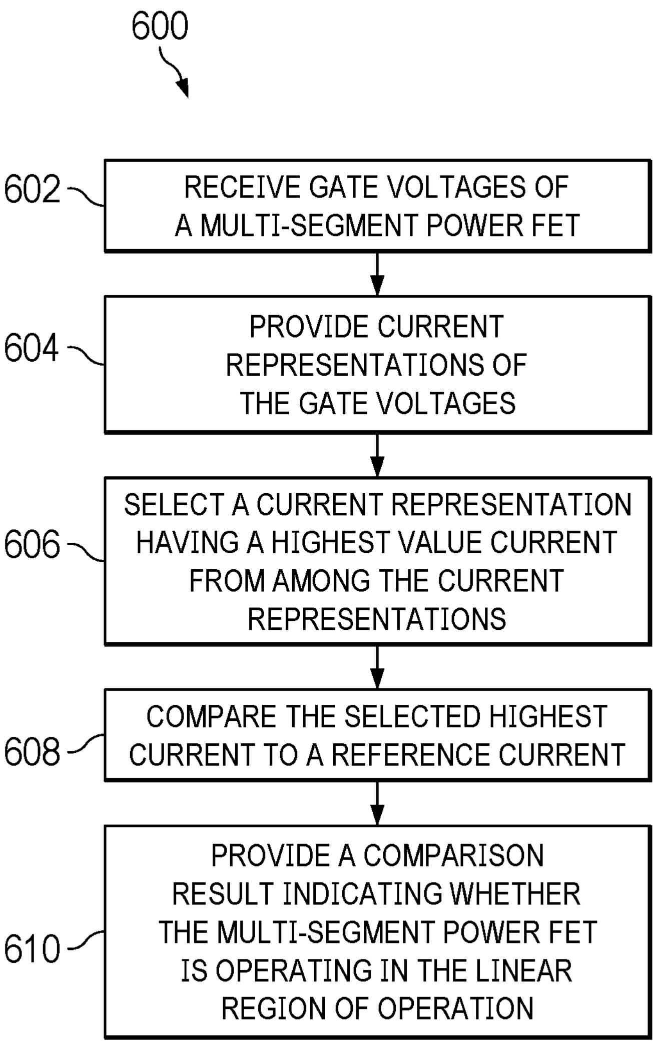
FIG. 6 is a flow diagram of a method, in accordance with various examples.

FIG. 6 is a flow diagram of a method 600, in accordance with various examples. In some examples, the method 600 is implemented by the system 100, such as the monitoring circuit 112. Accordingly, reference may be made to components or signals of any of the preceding drawings in describing the method 600.

At operation 602, gate voltages of a multi-segment power FET are received. In an example, the gate voltages are received by a V-I circuit, such as the V-I circuit 114, as described above herein. At operation 604, current representations of the gate voltages are provided. In some examples, the V-I circuit is configured to convert the gate voltages to currents to form the current representations. At operation 606, a current representation having a highest value current from among the current representations is selected. In an example, the selection is performed by a current selection circuit, such as the current selection circuit 116, as described above herein. At operation 608, the selected highest current is compared to a reference current. In an example, the comparison is performed by a comparator, such as the comparator 120, as described above herein. At operation 610, the comparator provides a comparison result indicating whether the multi-segment power FET is operating in the linear region of operation (e.g., each gate of the multi-segment power FET is in an enhanced state).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An apparatus comprising:

a field effect transistor (FET) having first and second segments, in which the first segment has a first gate, a first source and a first drain, the second segment has a second gate, a second source and a second drain, the first and second sources are coupled together, and the first and second drains are coupled together;

first and second voltage-to-current circuits, the first voltage-to-current circuit coupled to the first gate, and the second voltage-to-current circuit coupled to the second gate;

a current selection circuit having a current selection circuit output and first and second current selection inputs, the first current selection circuit input coupled to the first voltage-to-current circuit, and the second current selection circuit input coupled to the second voltage-to-current circuit; and a comparator having a comparator output and first and second comparator inputs, the first comparator input coupled to the current selection circuit output, and the comparator configured to receive a reference signal at the second comparator input, wherein:

the first voltage-to-current circuit includes a first transistor having a first gate, a first source, and a first drain, the first gate coupled to the first gate of the first segment, and the first source coupled to a power terminal through a first transistor;

the second voltage-to-current circuit includes a second transistor having a second gate, a second source, and a second drain, the second gate coupled to the second gate of the second segment, and the second source coupled to the power terminal through a second transistor; and the current selection circuit includes:

a third transistor having a third gate, a third source and a third drain, the third drain coupled to the first drain;

a fourth transistor having a fourth gate, a fourth source and a fourth drain, the fourth gate coupled to the first drain, the fourth drain coupled to the power source, and the fourth source coupled to the third gate;

a fifth transistor having a fifth gate, a fifth source and a fifth drain, the fifth gate coupled to the third gate, and the fifth drain coupled to the second drain;

a sixth transistor having a sixth gate, a sixth source and a sixth drain, the sixth gate coupled to the second drain, the sixth drain coupled to the power source, and the sixth source coupled to the fifth gate; and a seventh transistor having a seventh gate, a seventh source and a seventh drain, the seventh gate coupled to the third gate and the fifth gate, and the seventh source coupled to the third source and the fifth source.

2. The apparatus of claim 1, wherein the current selection circuit includes an eighth transistor having an eighth gate, an eighth source and an eighth drain, the eighth transistor configured to receive a bias current at the eighth gate, the eighth drain coupled to the seventh gate, and the eighth source coupled to the seventh source.

3. The apparatus of claim 1, further comprising:

a ninth transistor having a ninth gate, a ninth source, and a ninth drain, the ninth gate coupled to the seventh source, and the ninth drain coupled to the first comparator input;

a current mirror coupled between the seventh drain and the ninth source; and a third resistor coupled between the ninth drain and ground.

4. The apparatus of claim 1, further comprising:

a tenth transistor having a tenth gate, a tenth source, and a tenth drain, the tenth gate coupled to a reference current input, and the tenth source coupled through the fourth transistor to the power terminal;

an eleventh transistor having an eleventh gate, an eleventh source, and an eleventh drain, the eleventh gate coupled to the seventh source, the eleventh drain coupled to the tenth drain, and the eleventh source coupled to the second comparator input; and a fifth resistor coupled between the eleventh source and a ground terminal.

5. The apparatus of claim 4, further comprising:

a twelfth transistor having a twelfth gate, a twelfth source and a twelfth drain, the twelfth gate coupled to the twelfth drain, and the twelfth source coupled to the seventh source; and a sixth resistor coupled between the reference current input and the twelfth drain.

6. An apparatus, comprising:

voltage-to-current circuits coupled to respective gates of a multi-segment field effect transistor (FET), the voltage-to-current circuits configured to convert voltages from the gates of the FET into respective currents;

a current selection circuit coupled to the voltage-to-current circuits, the current selection circuit configured to select a highest value current from among the respective currents; and a comparator coupled to the current selection circuit, the comparator configured to compare the selected highest current to a reference current.

7. The apparatus of claim 6, wherein responsive to the selected highest current having a value greater than the reference current the comparator provides an output signal indicating that the FET is operating in a linear region of operation.

8. The apparatus of claim 6, further comprising a reference generator coupled to the comparator, the reference generator configured to provide the reference current.

9. The apparatus of claim 6, wherein the voltage-to-current circuits include first and second voltage-to-current circuits, the first voltage-to-current circuit coupled to a first segment of the multi-segment FET, and the second voltage-to-current circuit coupled to a second segment of the multi-segment FET.

10. The apparatus of claim 9, wherein the first voltage-to-current circuit includes a first transistor having a first gate, a first source, and a first drain, the first gate coupled to a gate of the first segment, and the first source coupled to a power source through a first transistor, and wherein the second voltage-to-current circuit includes a second transistor having a second gate, a second source, and a second drain, the second gate coupled to a gate of the second segment, and the second source coupled to the power source through a second transistor.

11. The apparatus of claim 10, wherein the current selection circuit has a current selection circuit output and first and second current selection inputs, the first current selection input coupled to the first voltage-to-current circuit and the second current selection input coupled to the second voltage-to-current circuit.

12. The apparatus of claim 11, wherein the current selection circuit includes:

a third transistor having a third gate, a third source, and a third drain, the third drain coupled to the first drain;

a fourth transistor having a fourth gate, a fourth source, and a fourth drain, the fourth gate coupled to the first drain, the fourth drain coupled to the power source, and the fourth source coupled to the third gate;

a fifth transistor having a fifth gate, a fifth source, and a fifth drain, the fifth gate coupled to the third gate, and the fifth drain coupled to the second drain;

a sixth transistor having a sixth gate, a sixth source, and a sixth drain, the sixth gate coupled to the second drain, the sixth drain coupled to the power source, and the sixth source coupled to the fifth gate; and a seventh transistor having a seventh gate, a seventh source, and a seventh drain, the seventh gate coupled to the third gate and the fifth gate, and the seventh source coupled to the third source and the fifth source.

13. The apparatus of claim 12, wherein the comparator has first and second comparator inputs, the first comparator input coupled to the seventh transistor drain through a current mirror, and the second comparator input coupled to a reference current input.

14. A system, comprising:

a multi-segment field effect transistor (FET) having first and second segments, each of the first and second segments having a respective gate, source, and drain, wherein the source of the first segment and the source of the second segment are coupled together, and the drain of the first segment and the drain of the second segment are coupled together;

an enhancement detection circuit coupled to the multi-segment FET, the enhancement detection circuit having:

first and second voltage-to-current circuits, the first voltage-to-current circuit coupled to the gate of the first segment, and the second voltage-to-current circuit coupled to the gate of the second segment;

a current selection circuit having a current selection circuit output and first and second current selection inputs, the first current selection circuit coupled to the first voltage-to-current circuit and the second current selection circuit input coupled to the second voltage-to-current circuit; and a comparator having a comparator output and first and second comparator inputs, the first comparator input coupled to the current selection circuit, and the second comparator input configured to receive a reference signal; and a protection circuit coupled to the comparator output and the multi-segment FET, the protection circuit configured to electrically decouple the multi-segment FET from a power source responsive to an asserted value at the comparator output, the asserted value indicating that the multi-segment FET is operating in a linear region of operation.

15. The system of claim 14, wherein the first voltage-to-current circuit includes a first transistor having a first gate, a first source, and a first drain, the first gate coupled to the gate of the first segment, and the first source coupled to a power source through a first transistor, and wherein the second voltage-to-current circuit includes a second transistor having a second gate, a second source, and a second drain, the second gate coupled to the second segment gate, and the second source coupled to the power source through a second transistor.

16. The system of claim 15, wherein the current selection circuit includes:

a third transistor having a third gate, a third source, and a third drain, the third drain coupled to the first drain;

a fourth transistor having a fourth gate, a fourth source, and a fourth drain, the fourth gate coupled to the first drain, the fourth drain coupled to the power source, and the fourth source coupled to the third gate;

a fifth transistor having a fifth gate, a fifth source, and a fifth drain, the fifth gate coupled to the third gate, and the fifth drain coupled to the second drain;

a sixth transistor having a sixth gate, a sixth source, and a sixth drain, the sixth gate coupled to the second drain, the sixth drain coupled to the power source, and the sixth source coupled to the fifth gate; and a seventh transistor having a seventh gate, a seventh source, and a seventh drain, the seventh gate coupled to the third gate and the fifth gate, and the seventh source coupled to the third source and the fifth source.

17. The system of claim 16, wherein the current selection circuit includes an eighth transistor having an eighth gate, an eighth source, and an eighth drain, the eighth gate to receive a bias current, the eighth drain coupled to the seventh gate, and the eighth source coupled to the seventh source.

18. The system of claim 17, further comprising:

a ninth transistor having a ninth gate, a ninth source, and a ninth drain, the ninth gate coupled to the seventh source, and the ninth drain coupled to the first comparator input;

a current mirror coupled between the seventh drain and the ninth source;

a third resistor coupled between the ninth drain and ground;

a tenth transistor having a tenth gate, a tenth source, and a tenth drain, the tenth gate coupled to a reference current input, and the tenth source coupled to the power source through a fourth transistor;

an eleventh transistor having an eleventh gate, an eleventh source, and an eleventh drain, the eleventh gate coupled to the seventh source, the eleventh drain coupled to the tenth drain, and the eleventh source coupled to the second comparator input;

a fifth resistor coupled between the eleventh source and ground;

a twelfth transistor having a twelfth gate, a twelfth source, and a twelfth drain, the twelfth gate coupled to the twelfth drain, and the twelfth source coupled to the seventh source; and a sixth resistor coupled between the reference current input and the twelfth drain.

* * * * *